April 21, 1936.  F. C. FRANK  2,038,212
WHEEL
Filed June 29, 1932  2 Sheets-Sheet 1

INVENTOR.
FREDERICK C. FRANK
BY
ATTORNEY

April 21, 1936.  F. C. FRANK  2,038,212

WHEEL

Filed June 29, 1932  2 Sheets-Sheet 2

INVENTOR.
FREDERICK C. FRANK
BY
ATTORNEY

Patented Apr. 21, 1936

2,038,212

UNITED STATES PATENT OFFICE 2,038,212

WHEEL

Frederick C. Frank, South Bend, Ind., assignor to Bendix Aviation Corporation, South Bend, Ind., a corporation of Delaware Application June 29, 1932, Serial No. 620,012

1 Claim. (Cl. 301—6)

This invention relates to wheels and more particularly to wheels for aircraft.

Broadly, the invention comprehends a wheel including a casting comprising a hub, a radial load-carrying disk, a braking flange and a tire retaining flange. The hub has a relatively small radial flange to which is suitably secured a stamped radial load-carrying disk having a peripheral flange adapted to support, in conjunction with the radial load-carrying disk of the casting, a rolled rim on which is sleeved a removable tire retaining flange. The removable tire retaining flange, the rim and the flange on the stamped radial load-carrying disk are secured together by a retaining ring having portions engaging registering recesses in the rim and the flange on the stamped radial load-carrying disk.

An object of the invention is to provide an efficient means for securing a radial load-carrying disk and a rim together by a simple means including a suitable retaining ring for the tire retaining flange.

Another object of the invention is to provide a wheel structure including a radial load-carrying disk, a rim supported thereby, a tire retaining flange sleeved on the rim, and means for locking these elements against displacement including a retaining ring having portions extending into registering recesses in the radial load-carrying disks and the rim.

A further object of the invention is to provide in a wheel having a brake drum under the rim, a sufficiently rigid truss structure between the rim and drum to prevent undue distortion of the drum during excessive stresses imposed upon the rim during landing.

Other objects of the invention will appear from the following description taken in connection with the drawings forming a part of this specification, and in which.

Figure 1:
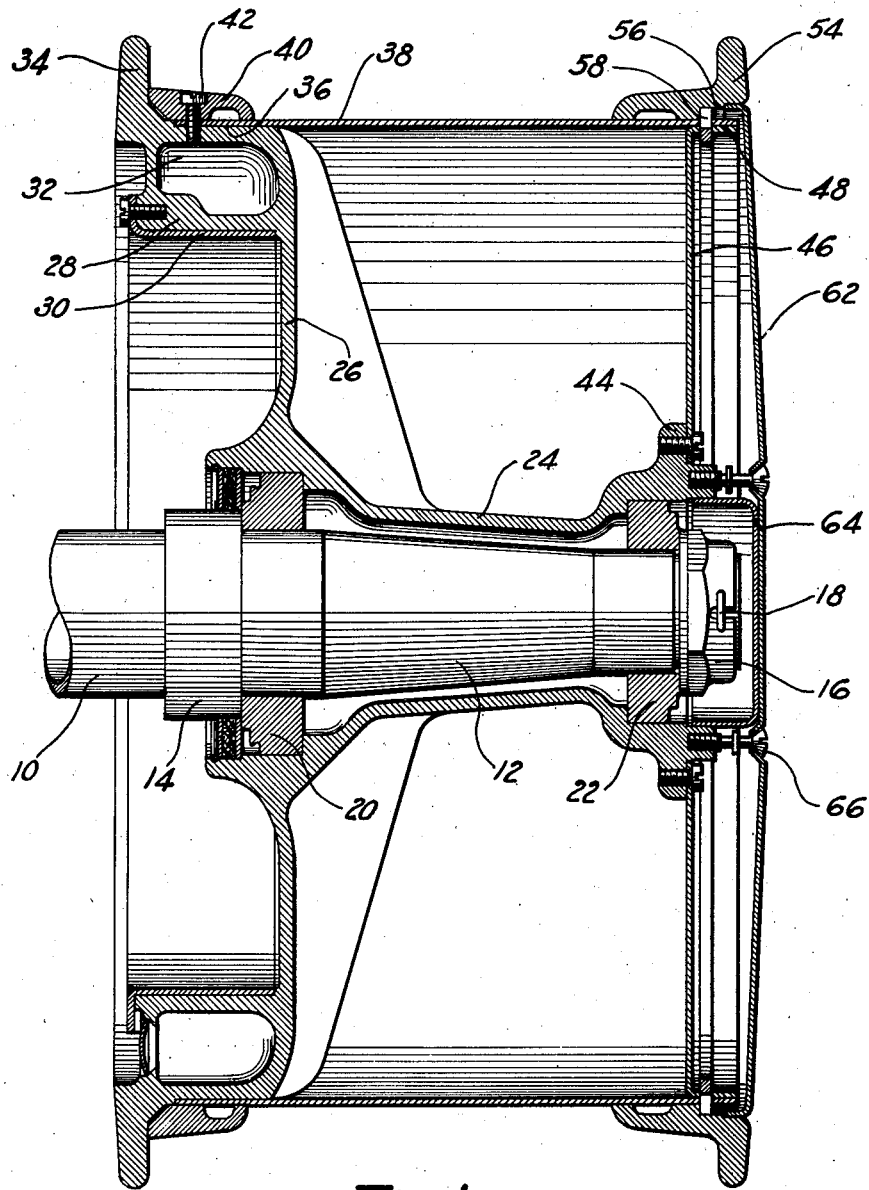
Figure 1 is a vertical sectional view of a wheel embodying the invention.
Figure 2:
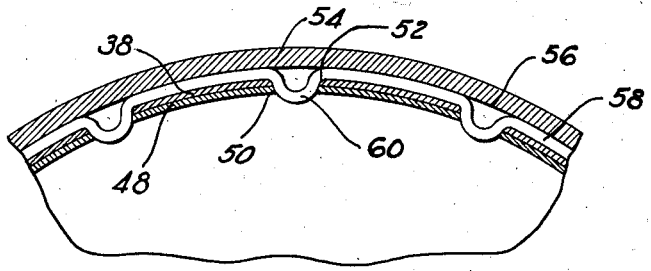
Figure 2 is a sectional view taken substantially on line 2—2, Figure 1, illustrating parts being broken away.

Figures 3, 4, 5, and 6 illustrate modifications of the retaining ring.

Referring to the drawings for more specific details of the invention, 10 represents an axle having a spindle 12 provided with a shoulder 14. The end of the spindle has threaded thereon a retaining nut 16 secured against displacement as by a cotter pin 18. Positioned on the axle are suitable bearing races 20 and 22. The bearing race 20 engages the shoulder 14 and the bearing race 22 engages the retaining nut 16, and positioned for rotation on the bearing races 20 and 22 is a wheel embodying the invention.

As shown, the wheel comprises a single casting including a hub 24 having a radial load-carrying disk 26 supporting a braking flange 28 to which is suitably secured a liner 30. The braking flange 28 has formed thereon a chamber 32 which may be filled with a cooling fluid. The wall of the chamber 32 supports a tire retaining flange 34 and is shouldered as indicated at 36 to receive one end of a rim 38, the rim being secured in position by a tire bead seat 40 secured in position as by screws 42 threaded through the tire bead seat, the rim and the wall of the chamber 32.

The walls of the chamber 32 comprise in effect an annular box girder construction which provides for rigidity in the rim section, and prevents excessive landing shocks from deforming or distorting the rim and brake drum, to such an extent as to cause the brake shoe to involuntarily engage the drum; or cause grabbing.

The hub 24 is provided with a relatively small circumferential flange 44 to which is suitably secured a stamped radial load-carrying disk 46 having an outwardly extended flange 48 having apertures 50 registering with corresponding apertures 52 in the rim 38. The rim 38 has sleeved thereon a removable tire retaining flange 54 provided with an annular shoulder 56.

As shown, a retaining ring 58 is sleeved on the rim 38. This retaining ring has offset portions 60 arranged in spaced relation and adapted to fit snugly in the registering openings 50 and 52 in the flange 48 on the radial load-carrying disk 46 and in the rim 38, to effectively lock the radial load-carrying disks and the rim together and to retain the tire retaining flange 54 against displacement.

Fitted to the tire retaining flange is a cover plate 62 which engages the annular shoulder on the tire retaining flange 54. The cover 62 has secured thereto a cup 64 fitted snugly in the end of the hub 24 and the peripheral flange on the cover plate 62 is fitted snugly to the annular shoulder 56 on the retaining flange 54. As shown, the cover plate 62 is secured to the hub as by screws 66 or other suitable securing means may be employed.

Figure 3:
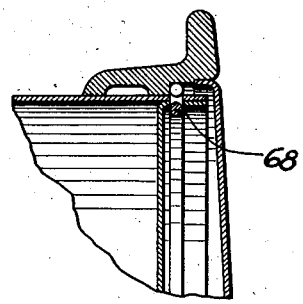

A modified form of the retaining ring is illustrated in Figure 3 wherein a wire 68 has portions bent radially inwardly and in spaced relation 55 to fit snugly in the registering recesses in the rim and flange on the radial load-carrying disk.

Figure 5:
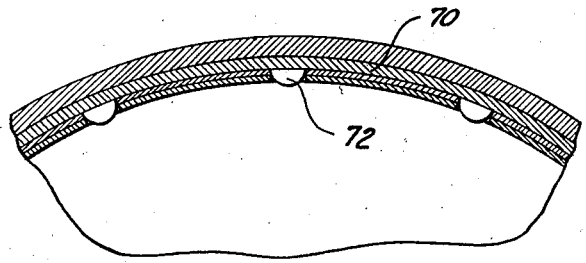
Figure 4:
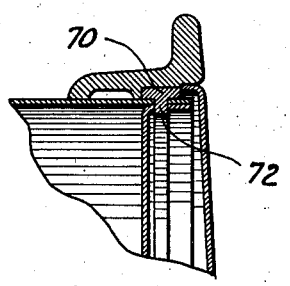
Figure 6:
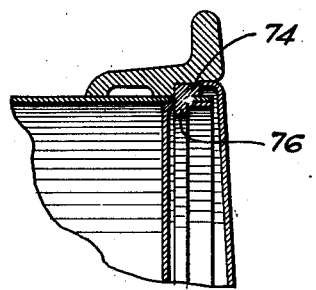

Figures 4 and 5 illustrate a modified form of the retaining ring wherein the ring is in the form of a band 70 having spaced lugs 72 adapted to fit in the registering apertures or openings in the rim and the flange on the radial load-carrying disk and Figure 4 illustrates a further modified form wherein the retaining ring is formed from a band 74 having radially inwardly extending spaced lugs 76 arranged on one edge thereof. Various other modified forms of the retaining ring may be used with equally good results.

Although this invention has been described in connection with certain specific embodiments, the principles involved are susceptible of numerous other applications that will readily occur to persons skilled in the art. The invention is, therefore, to be limited only as indicated by the scope of the appended claim.

Having thus described the various features of the invention, what I claim as new and desire to secure by Letters Patent is:

A wheel comprising a single casting including a hub, a radial load-carrying disk, a brake flange on the radial load-carrying disk, walls forming an annular chamber surmounting the flange, a tire retaining flange supported on and integral with a wall of the chamber, a rim supported at one end on the wall of the chamber, a tire bead seat sleeved on the rim, a radial disk connecting the other end of the rim with the hub, and means securing the tire bead seat, the rim and the last mentioned wall of the chamber together said chamber forming an annular box girder construction whereby rigidity of the tire flange and brake flange is increased.

FREDERICK C. FRANK.